No. 855,389. PATENTED MAY 28, 1907.
J. R. DAWKINS.
ELECTRIC ATTACHMENT FOR MOVABLE OBJECTS.
APPLICATION FILED FEB. 19, 1906.
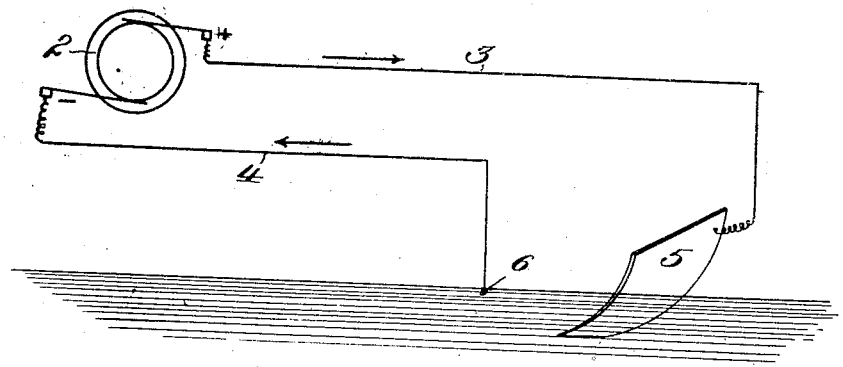
Witnesses:
Inventor
John R. Dawkins

UNITED STATES PATENT OFFICE.

JOHN R. DAWKINS, OF McKINNEY, TEXAS.

ELECTRIC ATTACHMENT FOR MOVABLE OBJECTS.

No. 855,389.   Specification of Letters Patent.   Patented May 28, 1907.

Application filed February 19, 1906. Serial No. 301,825.

*To all whom it may concern:*

Be it known that I, JOHN R. DAWKINS, a citizen of the United States, residing at McKinney, in the county of Collin and State of Texas, have invented new and useful Improvements in Electric Attachments for Movable Objects, of which the following is a specification.

This invention relates to a means to prevent the retarding of the travel of ground working devices and consists in introducing a current of electricity into a ground working device to prevent the adhering of soil to the device when it is traveling upon or through stubborn soil thereby overcoming the liability of the soil adhering to the device so that the travel thereof will not be tetarded.

For the purpose of illustration I have shown a ground working device, by way of example, a plow point, of ordinary construction, partly embedded in the soil and detached from the frame proper of the plow and in electrical connection with an electrical source having a positive and negative conductor, the former leading to and connected with the plow point and the latter having contact with the earth, thereby causing the current produced by the generator to flow therefrom through the positive conductor and the circuit to be completed by the negative conductor through the medium of the earth, such arrangement causing the current to flow through the plow point from the electrical source in one direction causing the earth to become non-cohesive so as to prevent the soil from adhering to the plow point. However, I desire it to be understood that the illustration accompanying the specification is simply shown for the purpose of obtaining a clear understanding of my invention, as the method and means, as will be hereinafter described, may be adapted to any other purposes for which it is found applicable without departing from the scope of my invention as set forth in the claims hereunto appended.

The drawing shows a diagrammatic view of my invention.

Similar numerals of reference indicate corresponding parts in the drawing.

In the drawing, the numeral 2 designates an electric generator or dynamo having any suitable voltage; and leading therefrom is a positive wire 3 and a negative wire 4, the connection of which may be made with the generator or dynamo 2 in any suitable manner. The positive wire 3 is connected to a plow point 5 of the ordinary type; and the negative wire 4 has contact with the soil so as to complete the circuit from the generator 2 by a direct current flowing through the positive wire 3 from the said generator 2 to the plow point 5 in contact with the earth, and thence through the negative wire 4 which also has contact with the earth. By directing the current in the manner as stated it will cause the soil to become non-cohesive and prevent the same from clogging or adhering to the plow point during the travel of the same.

There is a peculiar soil existing which, when slightly damp, as the ground usually is, causes a number of disadvantages when being cultivated or even where an object is traversing thereover by the sticking of the soil to the object to such an extent that it will soon become clogged, thus making it almost impossible to work the soil or to travel over the same. However, by introducing an electric current to the part of the agricultural implement or an object having contact with the ground and through the medium of which the current is completed, any liability of the soil becoming clogged or adhering to the object is overcome. It will be apparent that the electric generator or dynamo 2 can be placed either on the movable object in any suitable manner, or stationed at any suitable locality; and the stronger the voltage thereof, the better the results, as it is only necessary to provide a direct current to the object having contact with the ground; and as long as any part of the object is in contact with the soil the circuit is completed through the medium of the earth and the circuit is not broken until the contact member carried by the negative wire is withdrawn from the ground. This grounding for the negative wire may be done in any manner most convenient and practicable and according to the kind of plow points or movable objects with which it is to be connected, and in this instance I have shown the same as at 6 traveling with said movable object. The invention is also applicable to traction engines or other analogous vehicles; and the current produced by the said dynamo or generator 2 is caused to flow through the positive wire 3 to the wheel of the vehicle having connection with the latter, thence through the earth to negative wire 4 which has contact therewith, again to the said dynamo or generator, thereby completing the circuit and causing a continuous flow of electric current to the said wheel to prevent the sticky soil clogging or adhering to the wheel of the vehicle and overcoming liability of the soil impeding the movement of the vehicle, thus making the draft of the same much easier and lightening the weight thereof.

Having thus described the invention what is claimed is:

1. In combination, a ground working device, an electrical source, a positive conductor communicating therewith and electrically connected to the ground working device, and a negative conductor connected with said source and in contact with the ground for completing an electrical circuit thereby preventing the adhering of earthy substances to said device.

2. In combination, a ground working device, a source of electrical energy, an electrical connection between said source and said device, and electrical connections between said source and the ground thereby completing an electrical circuit to prevent the adhering of earthy substances to said device.

In testimony whereof I have hereunto set my hand in presence of two subscribing witnesses.

JOHN R. DAWKINS.

Witnesses:
M. E. GERRISH,
HENRY W. WARDEN.